United States Patent [19]
Kobayashi et al.

[11] Patent Number: 5,620,245
[45] Date of Patent: Apr. 15, 1997

[54] MANUSCRIPT DISPLAY APPARATUS

[75] Inventors: Akiyoshi Kobayashi, Shimada; Toru Yamana, Fujieda; Yoshitake Nakazawa, Shimizu; Shinichi Yamamoto; Hidenori Sato, both of Fujieda, all of Japan

[73] Assignee: Murakami Kaimeido Co., Ltd., Shizuoka, Japan

[21] Appl. No.: 499,107

[22] Filed: Jul. 6, 1995

[30] Foreign Application Priority Data

Jul. 25, 1994 [JP] Japan .................................. 6-192229
Jan. 27, 1995 [JP] Japan .................................. 7-031670

[51] Int. Cl.⁶ .................................................. G02B 17/06
[52] U.S. Cl. ............................................ 353/28; 359/630
[58] Field of Search ..................... 353/28, 122; 359/630, 359/631, 632; 352/4, 15–17

[56] References Cited

U.S. PATENT DOCUMENTS

| | | | |
|---|---|---|---|
| 2,711,667 | 6/1955 | Simijian | 352/4 |
| 2,860,544 | 11/1958 | Kahn | 352/4 |
| 4,729,067 | 3/1988 | Ohe | 362/97 |
| 4,836,786 | 6/1989 | Wong | 353/DIG. 3 |
| 5,013,149 | 5/1991 | Downum et al. | 353/42 |
| 5,187,597 | 2/1993 | Kato et al. | 359/630 |
| 5,207,495 | 5/1993 | Ahlstone | 362/97 |
| 5,210,624 | 5/1993 | Matsumoto et al. | 359/630 |
| 5,373,333 | 12/1994 | Kawada et al. | 353/122 |
| 5,444,506 | 8/1995 | Nakazawa et al. | 353/103 |
| 5,446,511 | 8/1995 | Kitahara et al. | 353/103 |
| 5,477,282 | 12/1995 | Moore | 353/122 |

FOREIGN PATENT DOCUMENTS 0122528  7/1983  Japan .......................... 353/DIG. 5

*Primary Examiner*—William Dowling
*Attorney, Agent, or Firm*—Michael J. Striker

[57] ABSTRACT

A manuscript display apparatus includes a bow-shaped main body having a light emitting body housed therein translucent diffusion plate arranged on top of the main body to diffuse light emitted from the light emitting body, a support portion rotatably supported with respect to the main body, and a half mirror supported at the tip end of the support portion. When the manuscript display apparatus is to be used, a manuscript sheet is placed on top of the diffusion plate in such a way that its surface on which a manuscript is written faces down to th diffusion plate. The light emitted from the light emitting body is diffused by the diffusion.plate and uniformly illuminate the manuscript sheet from the underside thereof. The light that passes through the manuscript sheet is reflected off the half mirror and therefor the manuscript is displayed as a virtual image. Because the virtual image is reversed at the half mirror, the virtual image displays the manuscript of the manuscript sheet in its original form.

14 Claims, 12 Drawing Sheets

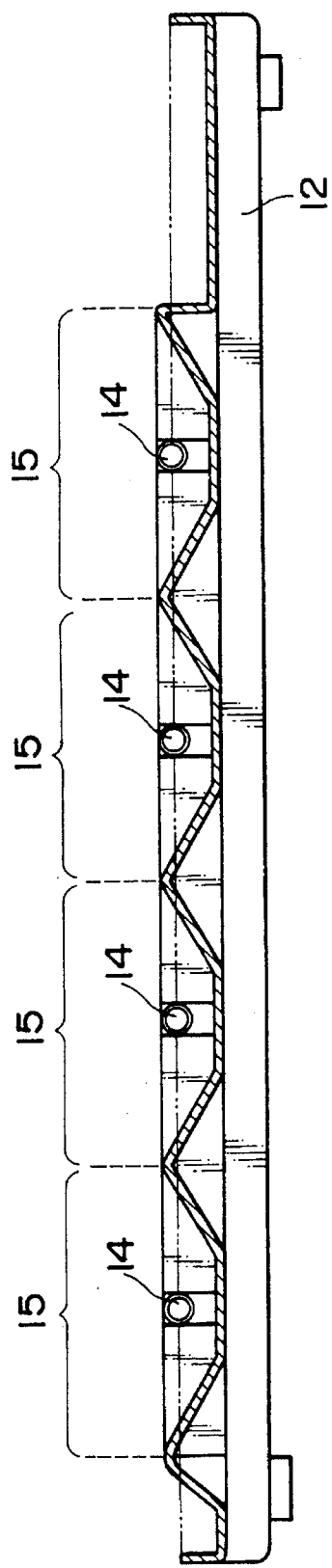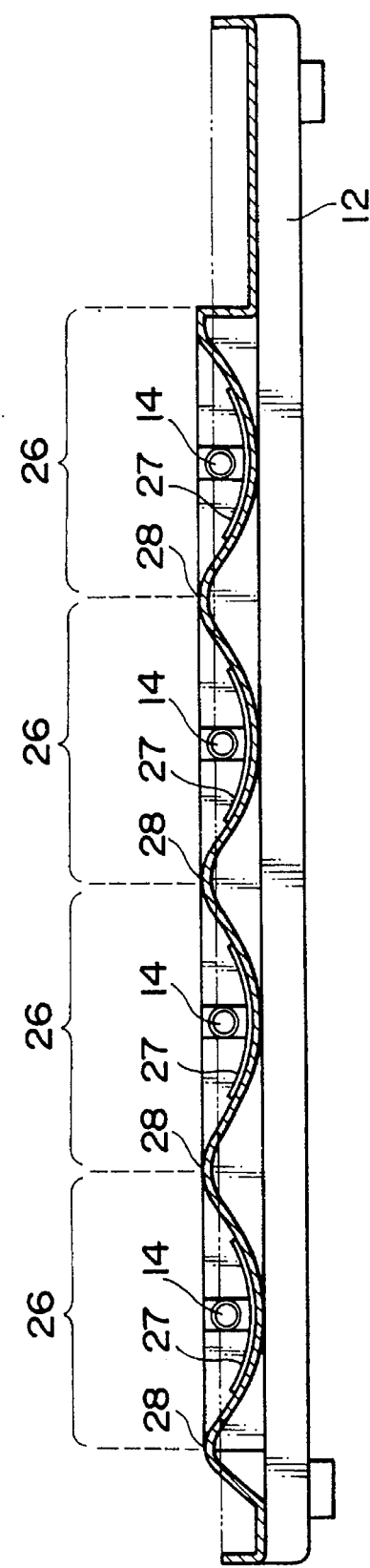

MANUSCRIPT DISPLAY APPARATUS

BACKGROUND OF THE INVENTION

1. Field of the Invention

The present invention relates to a manusript display apparatus, and in particular relates to a manuscript display apparatus that allows a speaker who is presenting a lecture or speech to view a manuscript without lowering his/her line of sight onto a manuscript sheet on which the manuscript is written.

2. Description of the Prior Art

Up to now, when a speaker who is presenting speeches or lectures gives his/her talks while reading previously prepared manuscripts, prompters are usually used. These prompters are constructed from an input device for inputting manuscript data, an image signal generating device for generating image signals based on the input data and outputting such image signals, an image display device for displaying an image of the manuscript on its screen based upon the image signals, and a half mirror for reflecting light emitted from the screen of the image display device. The input device is usually a keyboard and a floppy disk drive, and the image signal generating device is usually a personal computer or a word processor. The image display device is usually a CRT or an LCD or the like which is located on the top surface of the speaker's podium. Further, it is possible to use a videotape player as the image signal generating device described above. In this case, a video camera is used as the input device of the image signal generating device.

In the prompters described above, the manuscript data inputted from the input device is processed in the image signal generating device to produce image signals, and then these image signals are transmitted from the image signal generating device to the image display device. In the image display device, a manuscript is displayed on its screen with reversed form, and then the light emitted from this reversed image is reflected on a half mirror toward the eyes of the speaker. Accordingly, the speaker is able to view the manuscript without having to lower his/her line of sight to the speaker's podium. Further, the speaker is able to see the audience through the half mirror, while the audience is also able to see the speaker through the half mirror.

However, in the prompters described above, the image signal generating device which outputs image signals to the image display device needs to be provided either inside or outside the main body of the prompter. Further, in the case where a personal computer or a word processor is used as the image signal generating device, the manuscript must be previously inputted into it. Namely, when the manuscript is either a handwritten manuscript or a printed manuscript printed out by a word processor or the like, it is not possible to directly display such manuscript on the image display device. In order to display these types of manuscripts with the image display device of the prompter, it is necessary to input such manuscripts into a personal computer or the like. Therefore, when such a handwritten manuscript or a printed manuscript is used in the prompters, there is a problem in that such input of the manuscripts which is a very time-consuming and troublesome process is required.

Furthermore, in the case where a videotape recorder is used as the image signal generating device, it is necessary to record the manuscript onto videotape in advance with the use of a video camera which serves as the input device. This also requires time-consuming and troublesome process like the situation described above, since it is not possible to use the manuscript in its original form.

Moreover, in the case where a personal computer or the like is used as the image signal generating device, there is another problem in that a series of complex operations must be carried out.

Furthermore, since the image display device and the image signal generating device used in the prompter are expensive devices, there is other problem in that the prompter itself becomes quite expensive.

Moreover, since the image display device and the image signal generating device used in the prompter are heavy devices, there is still other problem in that the overall weight of the prompter makes it inconvenient to carry and transport.

Furthermore, the length of the half mirror support used in the prompter is several tens of centimeters long. Therefore, there is a further problem in that the prompter requires a rather bulky storage space when not in use, and such dimensions also make the prompter inconvenient to carry by hand.

Moreover, during the course of a lecture or speech, in order to check the elapsed time or the time remaining, the speaker must direct his/her line of sight away from the half mirror toward the location of a clock.

Furthermore, in the case where a microphone for use with a loudspeaker is used at the same time the prompter is being used, a microphone stand and the half mirror support must both be placed in front of the speaker, and these interfere with the audiences view.

Moreover, the frame of the half mirror is clearly visible to the audience, which may give uncomfortableness to the audience.

SUMMARY OF THE INVENTION

The present invention has been made in view of the problems which are involved in the prompters described above. Accordingly, it is an object of the present invention to provide a manuscript display apparatus which is able to overcome the problems involved in the prompters. Namely, it is an object of the present invention to provide a manuscript display apparatus which is capable of displaying even handwritten manuscripts in their original form. Further, it is another object of the present invention to provide a manuscript display apparatus in which operations of the apparatus are extremely easy to carry out. Furthermore, it is yet another object of the present invention to provide a manuscript display apparatus which is inexpensive and compact in size.

In this regard, it should be understood that the manuscript display apparatus according to the present invention differs from the prompters in which a CRT or an LCD used as an image display device is essentially required.

In order to achieve the above described objects, the manuscript display apparatus according to the present invention comprises manuscript sheet supporting means for supporting thereon a manuscript sheet in which a manuscript to be displayed is written; light generating means for generating light, the generated light being adapted to pass through the manuscript sheet to be supported on the manuscript sheet supporting means; and a half mirror for reflecting light which is emitted from the light generating means and then passes through the manuscript sheet.

According to the manuscript display apparatus according to the present invention, it is not necessary to carry out specific operation when used since the apparatus can be used simply by putting a manuscript sheet onto the manuscript sheet supporting means. Therefore, a speaker can start a lecture or speech immediately.

Further, since the manuscript display apparatus according to the present invention does not need to provide an expensive image display device such as a personal computer or the like which is required in the prompters, it can be manufactured with a low cost. In addition, since it is possible to reduce the weight of the manuscript display apparatus, the apparatus can be carried or transferred easily.

Furthermore, in the present invention, it is preferred that the half mirror is arranged at a position in the apparatus where a speaker who uses manuscript display apparatus is capable of seeing audience through the half mirror and audience is also capable of seeing the speaker therethrough.

The manuscript sheet supporting means is preferably formed from a light permeable plate which permits the light generated by the light generating means to pass therethrough, and more preferably the manuscript sheet supporting means is formed from a diffusion plate or a diffusion film which diffuses the light passing therethrough.

Further, preferably, the light generating means further includes a light source arranged underneath the manuscript sheet supporting means. More preferably, the light source is formed from a plurality of light emitting bodies.

The light generating means may further include reflection means for reflecting and diffusing the light emitted from the light emitting bodies. In this case, it is preferred that the reflection means includes a first portion which is relatively close to the manuscript sheet supporting means and a second portion which is relatively far from the manuscript sheet supporting means, in which the first portion has a lower reflectance than that of the second portion.

According to the manuscript display apparatus of the present invention, it is also possible to further include a support means for supporting the half mirror. This support means may be formed from a support portion composed of upper and lower support members. Preferably, the support portion is pivotally supported with respect to the main body 10 by means of the support portion holding portion 45 and the bolt 46. Therefore, since the support portion is foldable with respect to the main body of the apparatus and further it can be accommodated within a space formed in the main body, it is possible to make the entire size of the apparatus compact.

Further, according to the manuscript display apparatus, it is also possible to further include a time display means for displaying a time display image as a virtual image in the half mirror. By providing such a time display means, it is possible to check the elapsed time or the time remaining on the half mirror during the presentation.

Preferably, the time display means is formed from a number display element, and more preferably the time display means is constituted from a clock. Further, the time display means may be formed from a bar graph display element.

Further, according to the manuscript display apparatus of the present invention, it is also possible to further include a microphone which is incorporated within the half mirror support portion. By providing such a microphone, it becomes not necessary to put in front of the speaker any microphone stands which are likely to be obstacle to the audience view. In this case, it is preferable to additionally provide means for removably attaching the microphone to the half mirror support portion.

Furthermore, according to the manuscript display apparatus of the present invention, it is also possible to form the shape of the edges of the half mirror so as to have a semicircular cross section. By doing so, the light that is reflected inside the half mirror is diffused by the semicircular portions thereof, and this enables the brightness of such edges to be reduced to a level that no longer causes a burden or distraction to the audience.

Moreover, according to the manuscript display apparatus of the present invention, it is also possible to further provide a marker display means for displaying a marker image which indicates a desired position on the manuscript, thereby the marker image being displayed in the half mirror as a virtual image together with the image of the manuscript. Preferably, the marker display means includes a plurality of marker lights such as LED arranged at regular intervals, a switch for lighting up the marker lights, and a marker control means for controlling the lighting up of the marker lights, in which the operation of the switch causes the marker lights to be lit up sequentially. Alternatively, the marker display means may be formed from a plurality of marker lights such as LED arranged at regular intervals and a control means which sequentially lights up each marker light after a prescribed time interval has elapsed.

By providing such a maker display means, the position of the virtual image of the prescribed lit-up light such as LED allows the speaker to easily find the beginning of the next line of the manuscript to be read, and thereby makes it possible for the speaker to deliver a smooth presentation.

Moreover, according to the manuscript display apparatus of the present invention, it is also possible to further include manuscript sheet feeding means for supplying a manuscript sheet to the manuscript sheet supporting means. Preferably, the manuscript sheet feeding means is formed from a feeding unit which feeds the manuscript sheet onto the manuscript sheet supporting means and a winding unit for winding up a manuscript sheet which has been fed to the manuscript sheet supporting means. In this regard, it is also preferred that the manuscript sheet feeding means further includes a manuscript sheet fixing film adapted for holding a manuscript sheet thereon, in which the feeding unit feeds a manuscript sheet held by the manuscript sheet fixing film to the manuscript sheet supporting means and the winding unit winds up the manuscript sheet which has been fed out to the manuscript sheet supporting means by the feeding unit.

According to this structure, by activating the winding unit to wind up the fixing film by the winding unit, it becomes possible for the speaker to read sequentially each page of the manuscript sheets. Furthermore, by activating the feeding unit, it becomes possible to easily re-display any page that was previously displayed and wound around the roller of the winding unit.

BRIEF DESCRIPTION OF THE DRAWINGS

FIG. 3 is a cross-sectional view of the embodiment shown in FIG. 2 which is taken along line A—A thereof;

FIG. 4 is a cross-sectional view of another embodiment of the manuscript display apparatus according to the present invention, which is taken along the line same as the line A—A of FIG. 2;

DETAILED DESCRIPTION OF THE PREFERRED EMBODIMENTS

With reference to the appended drawings, a detailed description of the preferred embodiments of a manuscript display apparatus according to the present invention will now be given below. First, after explaining the principle of a manuscript display apparatus according to the present invention, a series of descriptions of each device of the manuscript display apparatus will be given in sequential order, with a description of a manuscript feeding apparatus be given last.

Now, it should be noted that the term "manuscript" as used in this application refers to any collection of numbers, characters, drawings or pictures written, printed or arranged on a medium such as paper, plastic sheets or the like. Further, hereinafter, such a medium on which the manuscript is written or described is referred to as "manuscript sheet".

Principle of the Invention

Figure 1:
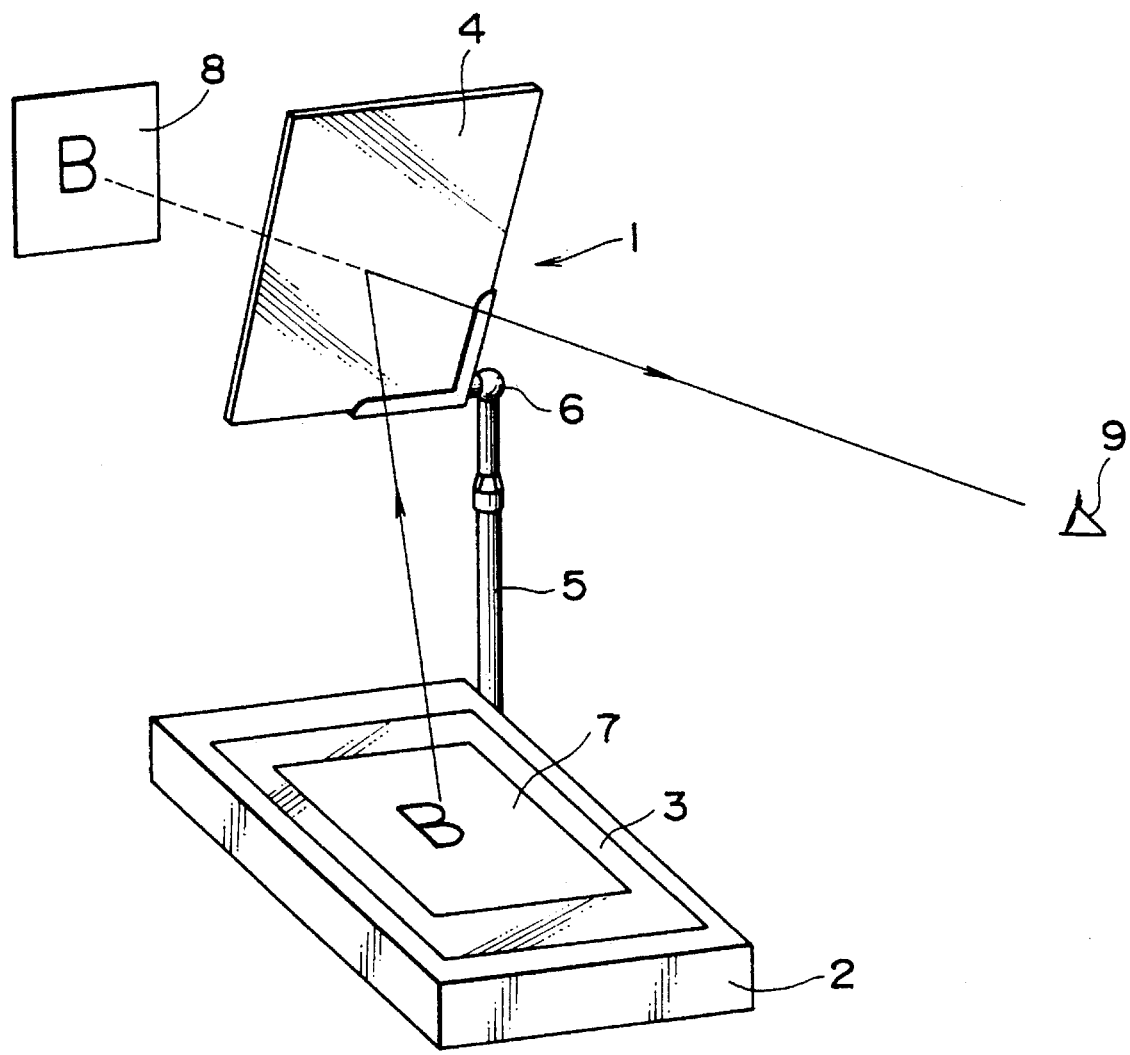
FIG. 1 is an illustration showing the principle of a manuscript display apparatus according to the present invention.

FIG. 1 is an illustration showing the principle of a manuscript display apparatus according to the present invention. As shown in this illustration, a manuscript display apparatus 1 includes a box-shaped main body 2 having a light emitting body (not shown in FIG. 1) housed therein, a diffusion plate 3 through which light emitted from the light emitting body is transmitted, the diffusion plate 3 being arranged on top of the main body 2 to diffuse the light, a support body 5 having one end supported by the main body 2 and the other end provided with a support portion 6, and a half mirror supported by the support portion 6 and held at a height that roughly corresponds to the eye level of a speaker.

When the manuscript display apparatus is to be used, a manuscript sheet 7 which is formed from a normal paper is placed on top of the diffusion plate 3 in such a manner that a surface of the sheet on which the manuscript is written (hereinafter; referred to as a "front side") faces toward the diffusion plate 3 and the upper side of the sheet is positioned closest to the speaker. In this state, it is virtually impossible to make out the contents of the manuscript from the back side of the manuscript sheet 7 (hereinafter, referred to as a "back side").

Next, when light is emitted from the light emitting body inside the main body 2, the emitted light becomes diffused by the diffusion plate 3 and uniformly illuminate the manuscript sheet 7 from the front side thereof. This diffused light transmitting through the diffusion plate 3 then causes the characters of the manuscript written on the manuscript sheet 7 to appear as mirror image characters when viewed from the back side of the manuscript sheet 7.

According to experiments performed by the present inventor, it was found that high quality and medium quality papers can be preferably used as a manuscript sheet for use in this apparatus, since these papers can clearly project the manuscript on the back side of the manuscript sheet 7. Further, it has also been found that most of papers which are usually used as papers on which a manuscript is written can be used as a manuscript sheet for use in this apparatus excepting papers that do not completely transmit light therethrough. Furthermore, it is of course possible to use transparent papers and tracing papers which have excellent light transmission characteristics. In this regard, it should be noted that in the case where a mirror image text which is prepared by using a personal computer or a copy machine and tracing paper or the like is used as the manuscript sheet, such a mirror image text is placed on the diffusion plate 3 in such a way that the front side thereof on which the reversed manuscript is described faces up.

As for the light that passes through the manuscript sheet 7, one part of such light is reflected on the half mirror 4 and is displayed as a virtual image 8. The virtual image 8 is a mirror image of the image which has been reflected on the half mirror 4, the virtual image 8 is an erected image and therefore the manuscript of the manuscript sheet 7 is displayed in its original form. Therefore, by using the manuscript display apparatus according to the present invention, it is possible for a speaker to read the manuscript through the virtual image 8 without having to lower his/her line of sight to the podium, and thus enables the speaker to continue speaking while maintaining a line of sight toward the audience.

Overall Structure of the Manuscript Display Apparatus

Figure 2:
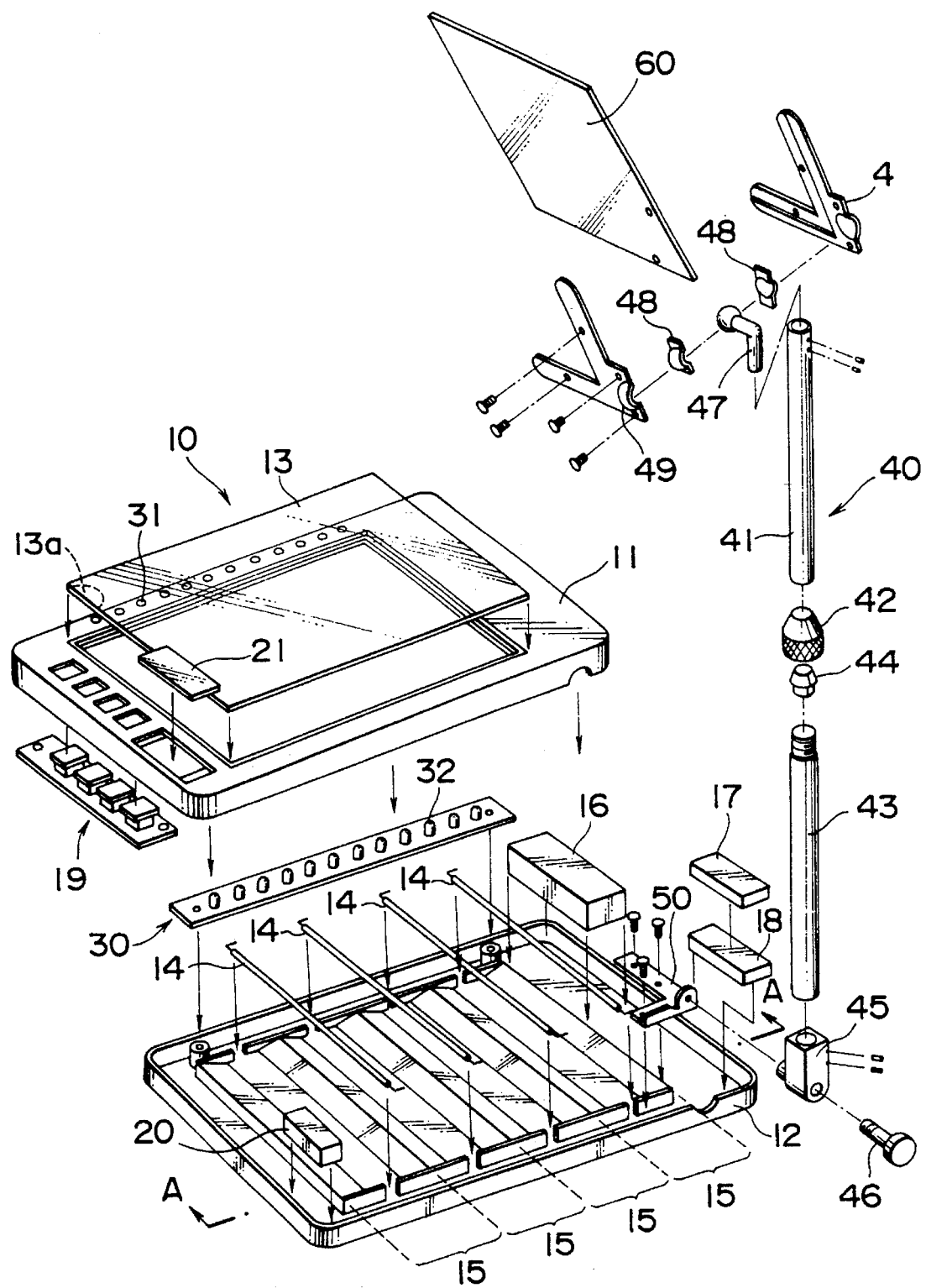
FIG. 2 is an exploded view of the overall construction of one embodiment of a manuscript display apparatus according to the present invention.

FIG. 2 is an exploded view of the overall construction of one embodiment of a manuscript display apparatus according to the present invention. As shown in FIG. 2, the manuscript display apparatus includes a main body 10 provided with a light emitting portion, a support portion 40 supported by the main body 10, and a half mirror 60 supported by the support portion 40 via a ball joint. Now, a description of each of the main body 10, the support portion 40 and the half mirror 60 will be given below in respective order.

The main body 10 includes a main body cover 11 and a main body bottom portion 12. Provided on top of the main body cover 11 is a diffusion plate 13, a cover 21 of a time display and a switch 19. Further, on the top of the main body cover 11, there are formed a plurality of marker display windows 31 so as to lie along a straight line. In the central portion of the inner portion of the main body bottom portion 12, four light emitting bodies 14 are provided so as to run parallel with each other. Further, for reflecting the light emitted from the light emitting bodies 14, reflecting portions 15 are provided on the main body bottom portion 12 in such a way that each of the reflecting portions 15 is positioned underneath the corresponding respective light emitting bodies 14. Further, the main body bottom portion 12 is provided with a time display portion 20, a marker portion 20, a power supply 16, a control section 17, an inverter 18 and a fixing plate 50.

Any light emitting means which is capable of uniformly illuminating the entire range of the diffusion plate 13 may be used for the light emitting bodies 14, and examples of the preferred light emitting means include cold-cathode discharge tubes, hot-cathode discharge tubes and electroluminescent lights and the like. In this connection, it is preferred that the light emitting bodies 14 be elements that generate only a small amount of heat. The reason for this is that if a large amount of heat is generated, it causes the manuscript sheet placed on top of the diffusion plate 13 to become so hot and dry, thus leading to a rolling or warping of the sheet.

FIG. 3 is a cross-sectional view of the main body bottom portion 12 taken along line A—A of FIG. 2 and shows the positional relationship between the light emitting bodies 14 and the reflecting portions 15. As shown in FIG. 3, the reflecting portions 15 are formed from a single sheet of aluminum by forming bends at prescribed positions along the sheet. In the present embodiment, the aluminum sheet is bent in such a way that the portions of the reflecting portions 15 that lie closest to the light emitting bodies form troughs and the portions of the reflecting portions 15 that lie relatively farther from the light emitting bodies form peaks, with each trough portion including a level portion. In order to prevent oxidation, the reflecting surfaces of the reflecting portions 15 are covered with a transparent coating. In this way, the reflecting surfaces of the reflecting portions 15 diffuse the light emitted from the light emitting bodies 14 over a wide area, and this makes it possible to uniformly illuminate the entire diffusion plate 13. At this point, it should be noted that the reflecting portions do not need to be made from an aluminum sheet, but instead may be made from a plastic sheet fold in the same way as described above and covered with a plated tape, a reflective tape or a white colored coating or the like.

Furthermore, FIG. 4 shows another embodiment of the reflective portions. In this embodiment, reflective portions 26 are formed from a single sheet of metal shaped so as to have a waveform-shaped cross section. Provided on portions of the reflective surface of the reflection portions 26 that lie relatively far from the underside surface of the diffusion plate 13 are reflective films 27 made from aluminum foil or the like so as to have a high reflectance. Further, the portions of the reflective surface of the reflection portions 26 that lie relatively close to the underside surface of the diffusion plate 13 are provided with a white colored coating surface having a low reflectance. In this way, because the reflecting portions 26 have a wave-shaped cross sections, there are no sudden changes between the angle of incident light and the angle of reflective light. Further, since the high reflectance portions are positioned relatively far from the underside surface of the diffusion plate and the low reflectance portions are positioned relatively close to the underside surface of the diffusion plate 13, it becomes possible to uniformly illuminate the entire diffusion plate 13.

In the manner described above, by using a plurality of light emitting bodies 14, and by providing either a reflecting portion 15 or a reflecting portion 26 for each of such light emitting bodies 14, it is possible to reduce the thickness of the main body 10. As a result, even when the spacing between the light emitting bodies 14 and the diffusion plate 13 is rather narrow, it is still possible to uniformly illuminate the entire diffusion plate 13. In this case, since the manuscript display apparatus according to the present invention does not require so large quantity of light as that required in an overhead projector (OHP) or a video projector for projecting characters or images onto a wall surface, but instead requires only enough light to make the characters of the manuscript become clearly visible through the back side of the manuscript sheet. Accordingly, the speaker is not lighted up by the light From the light emitting bodies 14 and the reflecting portions 15, 26 which shines onto the underside of the diffusion plate 13. Furthermore, it is possible to adjust the illuminance of the light emitting bodies 14 by means of an illuminance adjusting knob (not shown in the drawings) and the control portion 17.

The diffusion plate 13 is a milky white colored translucent resinous plate that has undergone a hard coat treatment. In this regard, any other material can be used For the diffusion plate 13 if it has light diffusion characteristics, and one such example is ground glass. Thus, in addition to the Function of the reflecting portions 15, 26, the diffusion plate 13 ensures that the light emitted from the light emitting bodies will be sufficiently diffused so as to uniformly illuminate the entire manuscript sheet, and this makes it possible For the entire manuscript sheet to be displayed in the half mirror as a virtual image having a uniform brightness.

In order to make it easy to remove a manuscript sheet from the diffusion plate 13, an indentation or a notch 13a may be formed in a peripheral portion thereof. In the particular case where the diffusion plate 13 is made of resin, such an indentation can be very useful, because static electricity sometimes causes the manuscript sheet to stick onto the diffusion plate which makes it somewhat difficult to remove the manuscript sheet.

Figure 5:
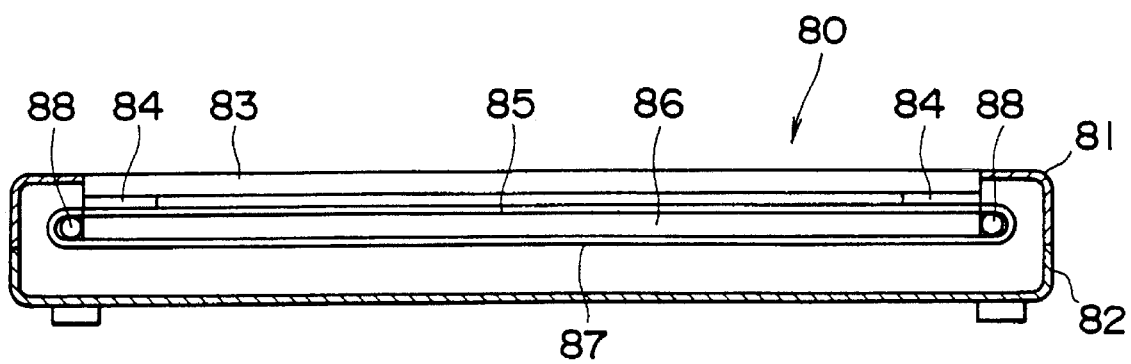
FIG. 5 is a cross-sectional side view showing a light emitting portion of a main body 80 of one embodiment of a manuscript display apparatus according to the present invention.

FIG. 5 is a cross-sectional view showing another embodiment of the main body of the manuscript display apparatus having the light emitting portion shown in FIG. 2. In this embodiment, the light emitting portion is constructed from a lighting method so called as "edge lights". Namely, the main body 80 is constructed from a main body cover 81 and a main body bottom portion 82. Fixed to the main body cover 81 is a light permeable acrylic plate 86. Two light emitting bodies 88 are provided inside the main body 80 so that they are positioned on either side of the acrylic plate 86 so as to run along the edge surface thereof in the lengthwise direction of the acrylic plate 86, respectively. A reflection film 87 is provided so as to cover the bottom surface of the acrylic plate 86 and the light emitting bodies 88. On the top surface of the acrylic plate 86, there is provided a diffusion film 85. Further, a light permeable plate 83 is provided on the top surface of the diffusion film 85 by means of a double-sided tape 84 provided at peripheral portions of the diffusion film 85.

In order for the top surface of the reflection film 87 to form a diffusible reflection surface, an innumerable number of silver colored reflection dots are provided on such reflection surface. The size of the reflections dots are relatively small in the regions of the reflection film 87 that lie relatively close to the light emitting bodies 88 and become increasing larger with increasing distance from the light emitting bodies 88. Accordingly, with this arrangement of reflection dots, the reflectance is high at the center portion of the reflection film 87 and then decreases as the distance to the light emitting bodies 88 becomes smaller. Thus, it becomes possible to uniformly illuminate the entire top surface of the acrylic plate 86 with the light that is emitted from the light emitting bodies 88 into the inside of the the acrylic plate 86. Further, the diffusion film 85 which is provided on top of the acrylic plate 86 is a resinous sheet processed to have irregular shaped surface so as to diffuse the light which shines out from the top surface of the acrylic plate 86. In this embodiment, the light permeable plate 83 is a transparent plate that has undergone a hard coating treatment. However, it is also possible to use a milky white colored translucent resinous plate or ground glass.

By using the edge light arrangement described above, the main body can be made relatively thin. Further, it is also possible to uniformly illuminate the entire manuscript sheet with the light emitted from two light emitting bodies 88.

Figure 6:
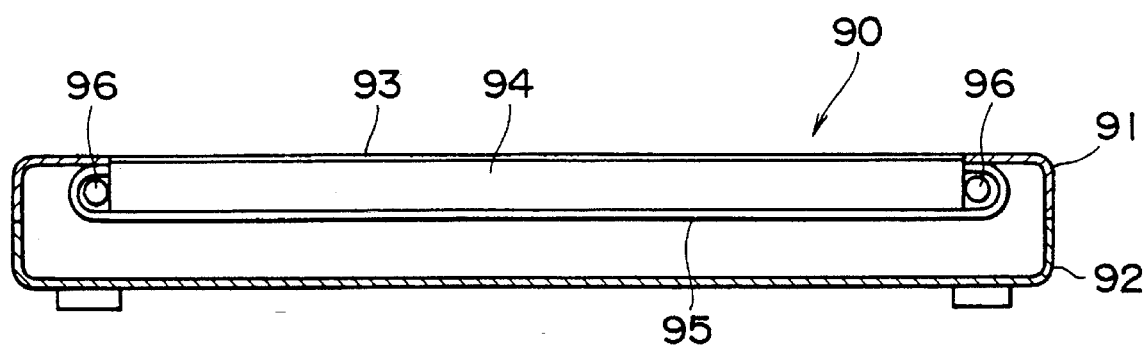
FIG. 6 is a cross-sectional side view showing a light emitting portion of a main body 90 of another embodiment of the manuscript display apparatus according to the present invention.

FIG. 6 is a cross-sectional view which shows another embodiment in which a similar edge light arrangement is used. In this embodiment, a main body 90 is constructed from a main body cover 91 and a main body bottom portion 92. Fixed to the main body cover 91 is a light permeable acrylic plate 94, and two light emitting bodies 96 are provided inside the main body 90 so that they are positioned on either side of the acrylic plate 94 so as to run along the edge surface thereof in the lengthwise direction of the acrylic plate 94, respectively. A reflection film 95 is provided so as to cover the bottom surface of the acrylic plate 94 and the light emitting bodies 96. Further, on the top surface of the acrylic plate 94, there is provided a diffusion film 93.

In order for the top surface of the reflection film 95 to form a diffused reflection surface, an innumerable number of silver colored reflection dots are provided on such reflection surface. The size of the reflections dots are relatively small in the regions of the reflection film 95 that lie relatively close to the light emitting bodies 96 and become increasing larger with increasing distance from the light emitting bodies 96. Further, the diffusion film 95 which is provided on top of the acrylic plate 94 is a resinous sheet processed to have irregular shaped surface.

In this embodiment, there are fewer elements than those for the edge light arrangement shown in FIG. 5, and this makes it possible to make the main body even thinner.

Figure 7:
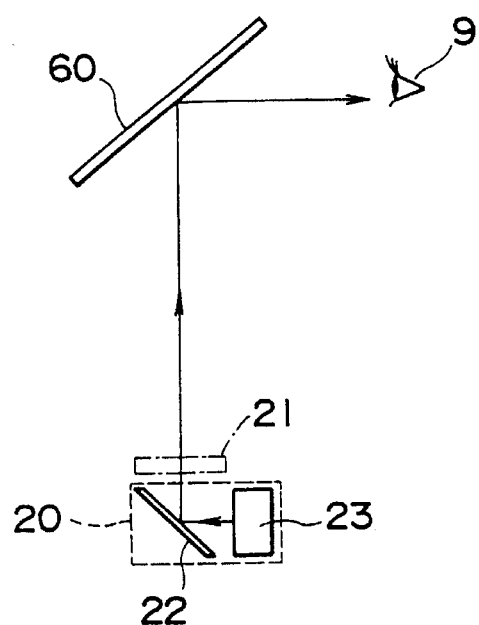
FIG. 7 is a diagram illustrating the principle of displaying time according to the present invention.
Figure 8:
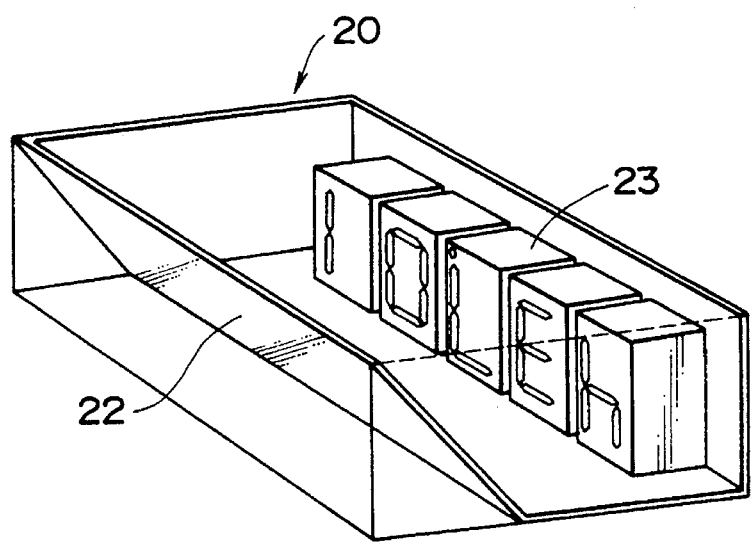
FIG. 8 is a perspective view of a time display section according to the present invention.

FIG. 7 is a diagram illustrating the principle of displaying time and FIG. 8 is a perspective view of a time display portion. As shown in FIG. 8, housed in the inside of a time display portion 20 is an inverted number display element 23 and a mirror 22 which faces the number display element 23. Formed in the top of the time display portion 20 is an opening which is covered by a transparent time display cover 21 provided in the main body cover 11. In this way, a time display image displayed by the number display element 23 is reflected by the mirror 22 to form a reversed mirror image. Then, after this mirror image is reflected by the half mirror 60, it is reversed once more to form an erected virtual image of the time display. Accordingly, a speaker is able to view a proper erected image of the time display without the need for a special number display element which displays time as a mirror image of itself.

Figure 9A:
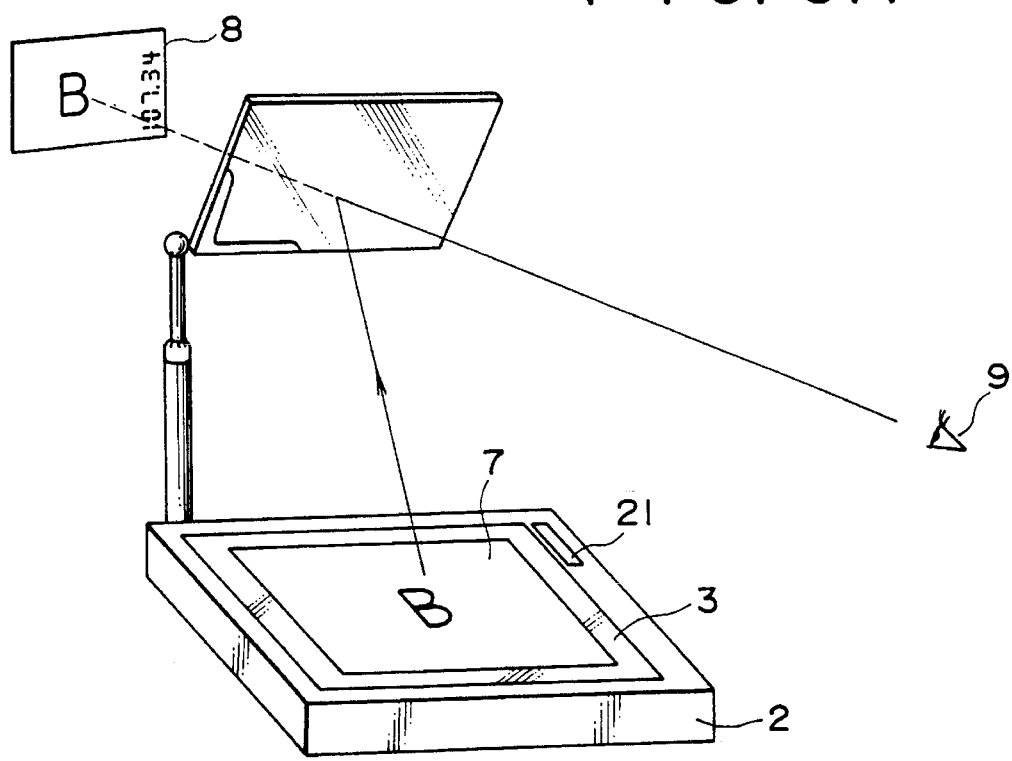
FIG. 9A is an explanatory drawing which shows the condition that one embodiment of the manuscript display apparatus according to the present invention is actually used.
Figure 10:
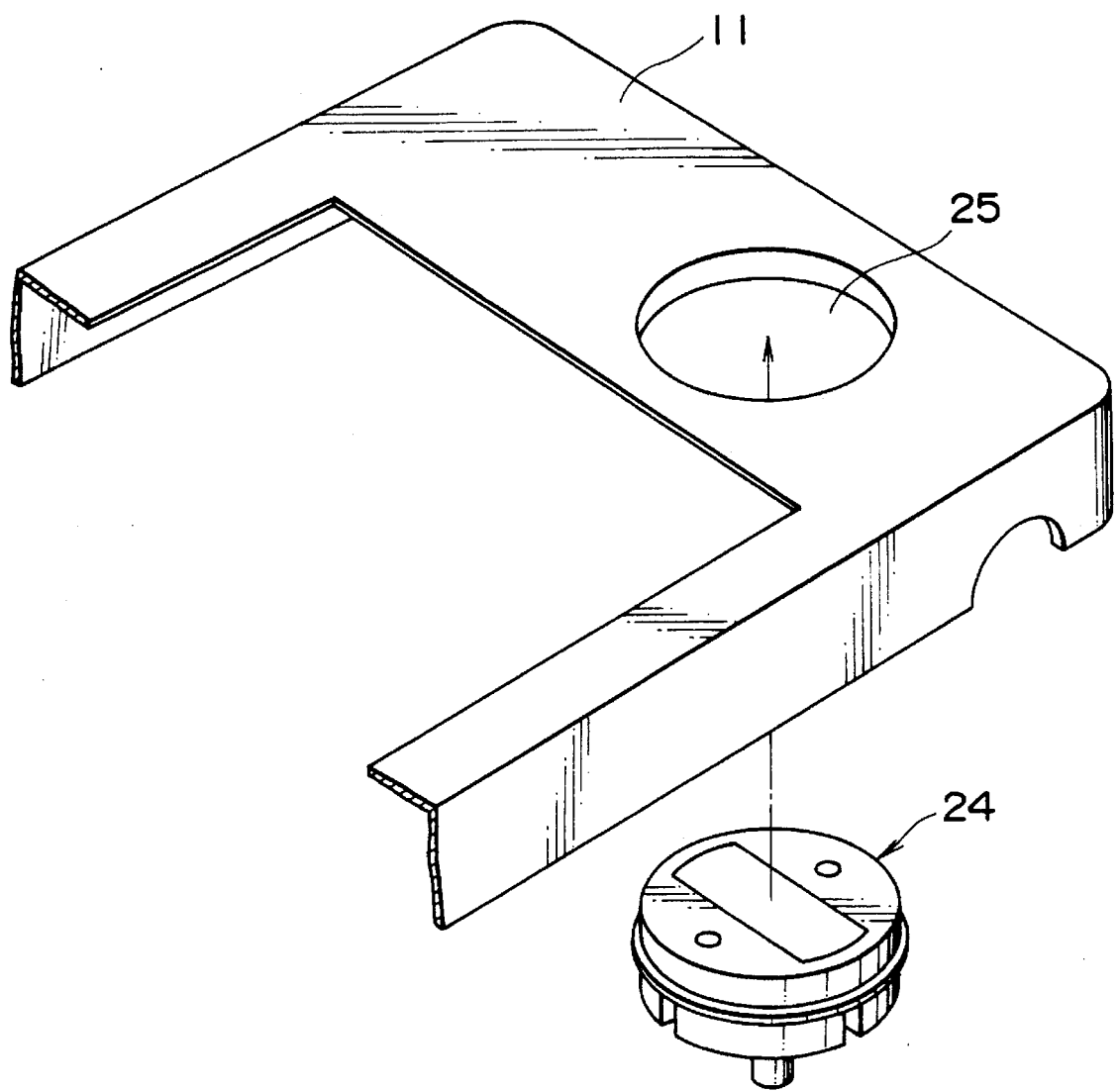
FIG. 10 is a perspective view showing the provision of a rotatable type time display unit 24 which is mounted in a mounting hole 25.

As shown in FIG. 9A, when the manuscript display apparatus is positioned sideways for use, the virtual image 8 of the above-described time display appears along in the vertical direction. To overcome this problem, it is possible to provide an embodiment like that shown in FIG. 10, in which the number display element 23 and the mirror 22 are housed inside a circular shaped rotatable unit 24 which is rotatable within a circular shaped mounting opening 25 formed in the main body cover 11. In this embodiment, it is possible to adjust the time display image to appear in any appropriate direction, whether the manuscript display apparatus is positioned lengthwise for use, as shown in FIG. 1, or sideways for use, as shown in FIG. 9A.

Furthermore, by operating the switch 19, it is possible to change the display mode of the time display portion 20 into any one of the display modes including (1) normal time display mode, (2) stopwatch mode, and (3) remaining time display mode. This makes it possible for the speaker to choose a desired time display mode and then observe the chosen display in the half mirror. Accordingly, the speaker does not need to move his/her line of sight in order to view the time display, and this enables the speaker to easily pace himself/herself when giving a presentation. Furthermore, in the above construction, a clock my be used as the number display element 23.

Figure 9B:
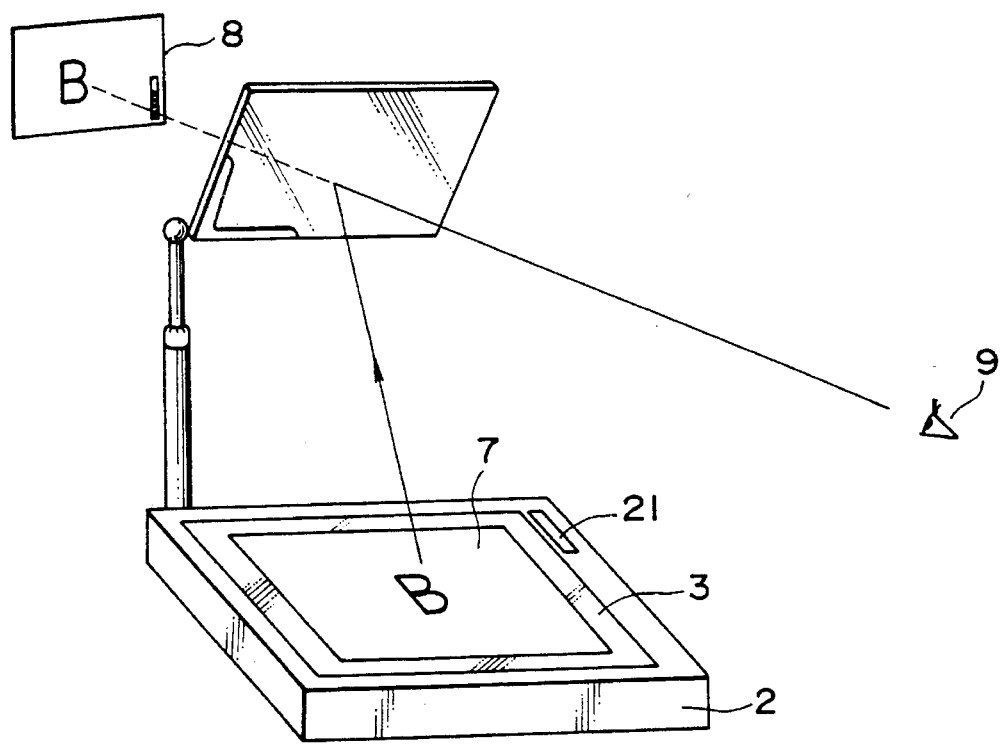
FIG. 9B is an explanatory drawing which shows the condition that the time is actually displayed using a bar graph time display.

Now, FIG. 9B shows another embodiment of a time display portion, in which the time display is indicated in the form of a bar graph. In particular, this type of bar graph time display is preferred for displaying the time remaining for the presentation. Namely, unit time is displayed as a bar graph display made up of unit line segments that represent a quantized amount of time, wherein the line segments disappear one at a time in sequential order for each prescribed unit of time that elapses. By using this type of bar graph time display, a speaker is able to judge simultaneously how much time has elapsed and how much time remains.

For the above described bar graph time display portion, it is possible to use an LED or a fluorescent character display tube, either of which can be arranged at the position of the time display cover 21 shown in FIG. 2. In this case, the bar graph time display is displayed directly in the half mirror 60 as a virtual image. Thus, by limiting the display to a simple graph that does not use characters or numerals, even if the virtual image displayed in the half mirror 60 is a mirror image of the original image, the speaker will still be able to easily read the bar graph time display with no feeling of disorientation or confusion. Moreover, this embodiment makes it possible to easily read the time display even when the manuscript display apparatus is positioned lengthwise for use, as shown in FIG. 1, or sideways for use, as shown in FIG. 9A. Furthermore, because an LED or a fluorescent display tube can be used to directly display the time display as a virtual image in the half mirror 60, there is no need for a time display image reversing means such as the mirror 22 shown in FIG. 7 and FIG. 8.

Figure 11:
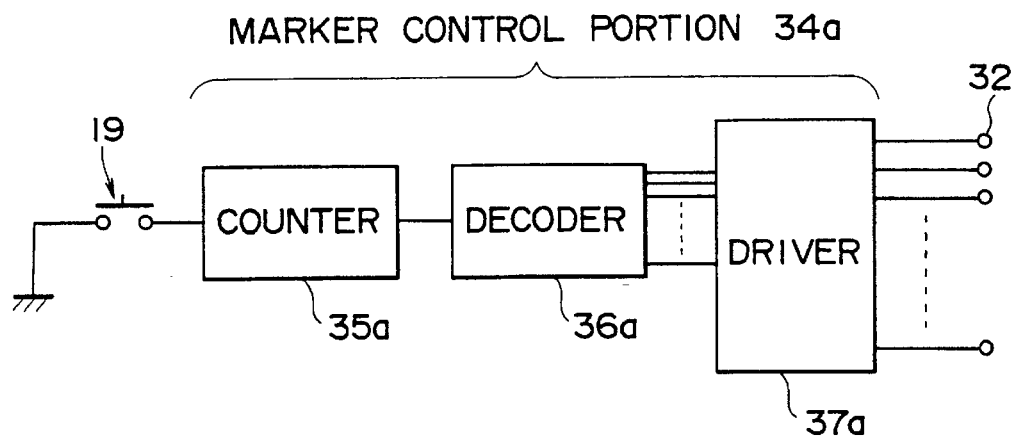
FIG. 11 is a block diagram of a manual type marker portion according to the present invention.

Now, a marker portion 30 is constructed from a plurality of LED 32 arranged in series as shown in FIG. 2 and a marker control portion 34a for controlling them. FIG. 11 is a block diagram of the marker control portion 34a. As shown by the block diagram, when a speaker operates the switch 19, an operation signal is sent sequentially through a counter 35a, a decoder 36a and a driver 37a to sequentially light up prescribed lights of the LED 32. In this way, by roughly coinciding the position of the prescribed lit-up light of the LED 32 with the beginning of the next line of the manuscript to be read, the position of the virtual image of the prescribed lit-up light of the LED 32 allows the speaker to easily find the beginning of the next line of the manuscript to be read, and thereby makes it possible for the speaker to deliver a smooth presentation.

Figure 12:
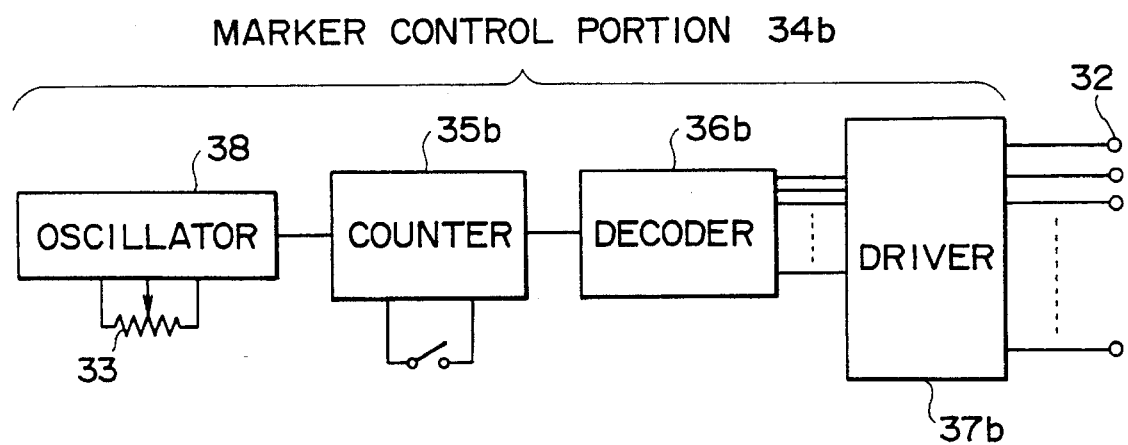
FIG. 12 is a block diagram of an automatic type marker portion according to the present invention.

Other embodiments are possible for the marker portion 30, such as an automatic marker display means in place of the maker displaying method as described above. In this connection, FIG. 12 shows a block diagram of an example automatic marker display portion 34b. According to this arrangement, by adjusting the resistance value of a variable resistor 33 in advance by operating the control knob (not shown in the drawing) of the variable resistor 33 to set the frequency of an oscillator 38 appropriately, it is possible to lighten up a prescribed LED 32 sequentially in a predetermined time interval. As a result, by merely reading a line of the manuscript indicated by the lit-up light of the LED 32 sequentially, a speaker can easily finish a presentation within a prescribed presentation time.

Furthermore, even though FIG. 2 shows the marker portion 30 being provided to run parallel to a lengthwise side of the diffusion plate 13, it is also possible to provide the marker portion 30 so as to run parallel to a widthwise side of the diffusion plate 13. In this way, by employing two groups of marker portions, it becomes possible to use an appropriate marker portion for any situation, regardless of whether the manuscript display apparatus is placed widthwise for use or whether the manuscripts are written horizontally or vertically. Furthermore, it is not necessary to provide a marker display window 31, and instead it possible to provide a plurality of LED 32 of the marker display portion 30 directly under a side portion of the diffusion plate 13. In this case, the light of the lit-up LED 32 passes through the diffusion plate 13 and the manuscript sheet and appears as a virtual image in the half mirror 60.

Now, as shown in FIG. 2, the support portion 40 includes a lower support member 43 and an upper support member 41 connected to the lower support member 43 by means of a joint 42 and a clamping collar 44 which allows the upper support member 41 to be expandable with respect to the lower support member 43.

On the top end of the upper support member 41, there are provided a ball joint 47 which has one end formed into a ball portion and the other end fastened to the top end of the upper support member 41, two collars 48 having matching portions for mating with the ball portion of the ball joint, and a pair of half mirror support plates 49 having socket portions adapted to mate with the matching portions of the collars 48. The half mirror support plates 49 thus constructed are coupled to the ball joint 47 via the collars 48 at the socket portions thereof.

On the lower end of the lower support member 43, there is provided a support portion holding member 45 which is fixed to the lower end portion of the lower support member 43 through screws. The support portion holding member 45 has a cylindrical portion integrally formed on one lateral side thereof, and an axial bore is formed through the cylindrical portion so as to pass through a bottom portion of the support portion holding member 45. A bolt 46 having a screw at a tip end thereof is inserted into the axial bore from the opposite lateral side of the support portion holding member 45.

Further, within the main body bottom portion 12, there is provided a fixed plate 50 which is fastened to the main body bottom portion 12. The fixed plate 50 has a bolt receiving hole to which the tip portion of the bolt 46 is adapted to be screwed. Further, at the corresponding side portions of the main body bottom portion 12 and the main body cover 11, there are formed semi-circular notches which form a circular hole when the main body bottom portion 12 and the main body cover 11 are assembled together. The circular hole has size and shape that can receive the cylindrical portion of the support portion holding member 45. Further, the bolt receiving hole of the fixed plate 50 is positioned so as to align with the circular hole.

Therefore, by inserting the cylindrical portion of the support portion holding member 45 into the circular hole of the main body 10, and then inserting the bolt 46 into the axial bore of the support portion holding member 45 and fastened into the bolt receiving hole of the fixed plate 50, it is possible for the support portion holding member 45 to be pivotally supported with respect to the main body 10.

Although in the above described embodiment the support portion 40 is pivotally supported with respect to the main body 10 by means of the support portion holding portion 45 and the bolt 46, it is also possible to form a support portion receiving hole in at least one corner of the main body upper cover 11 to allow insertion of the bottom end of the lower support member 43. Such a modified structure enables the support portion to be easily mountable to and demountable from the main body 10.

Figure 13:
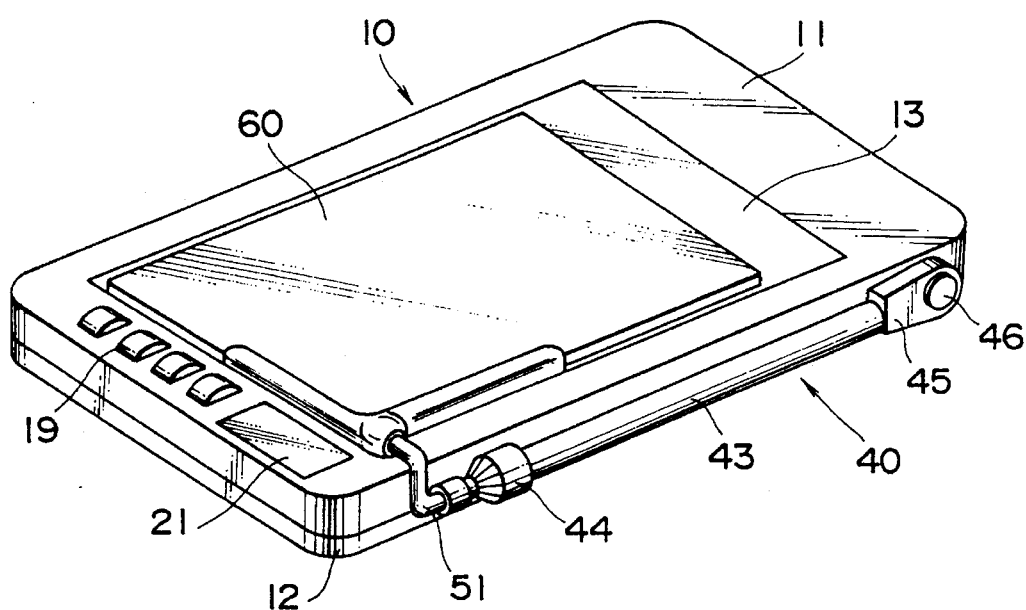
FIG. 13 is a perspective view of one embodiment of the manuscript display apparatus in which the half mirror is in a folded down state.

Now, in the embodiment shown in FIG. 13, the support portion 40 is equipped with a ball joint 51 which is bent to have a key-like shape. With this type of ball joint 51, the half mirror 60 becomes foldable onto the diffusion plate 13 as shown in the drawing, and this allows the manuscript display apparatus to be made compact for storage and transport.

Figure 14:
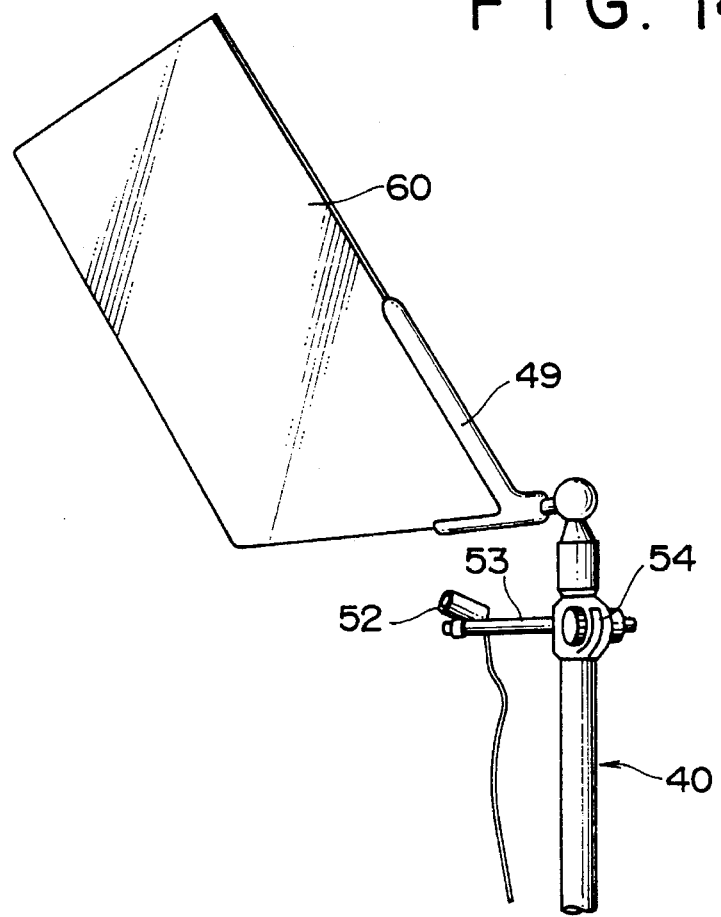
FIG. 14 is an exploded perspective view of an embodiment of a support portion provided with a clamp and a microphone stay to which is attached a wireless microphone.
Figure 15:
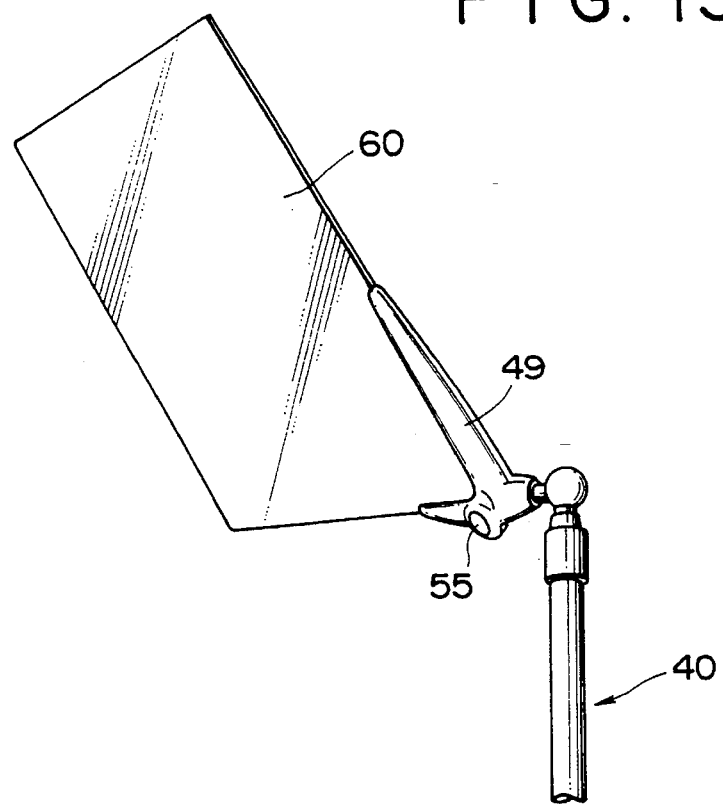
FIG. 15 is a perspective view of another embodiment of a support portion in which a microphone is housed within the half mirror support plates.
Figure 16:
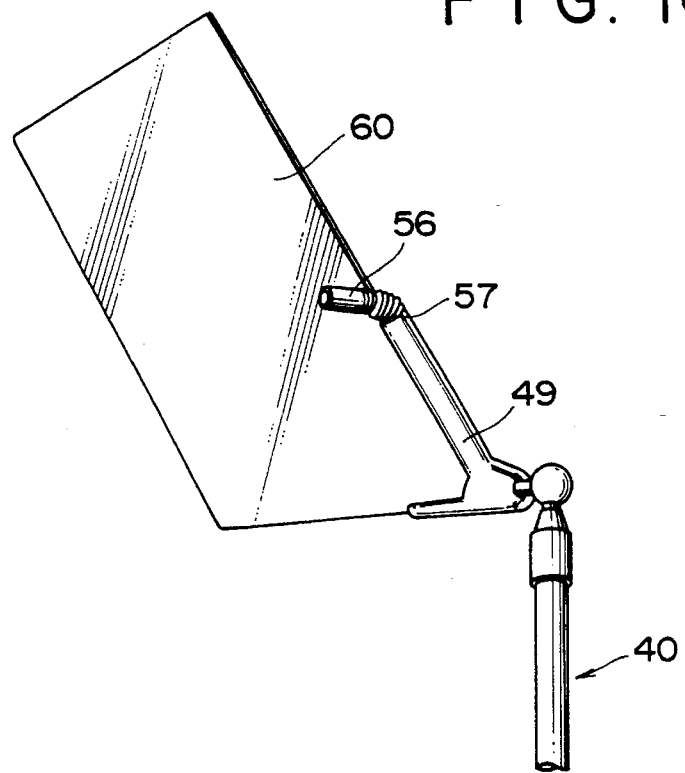
FIG. 16 is a perspective view of another embodiment of a support portion in which a microphone 56 is mounted on the half mirror support plates 49 by means of a flexible tube 57.

Next, FIGS. 14 through 16 show various embodiments of a microphone-equipped manuscript display apparatus. For the embodiment shown in FIG. 14, a clamp 54 is fastened to the support portion 40 and a microphone stay 53 is fixed to the clamp 54. Accordingly, it is possible to attach a wireless microphone 52 to the support portion 40 by fixing the clip of the microphone 52 to the microphone stay 53. In particular, this embodiment is advantageous because it is possible to use a small-size clip-type microphone normally to be attached to a tie or the like as it is, by attaching it to the microphone stay 53.

In the embodiment shown in FIG. 15, a microphone 55 is integrally held within a base portion of the half mirror support plates 49. According to this embodiment, since the microphone 55 is arranged within the half mirror support plates 49 and the cord thereof passes though the inside of the support portion 40, they do not obstruct the audience's view. In this case, a microphone output terminal would preferably be provided on a side of the main body 10.

For the embodiment shown in FIG. 16, a small-sized microphone 56 is mounted on an end portion of the half mirror support plates 49 via a flexible tube 57. According to this embodiment, as was explained for the embodiment of FIG. 15, the provision of the microphone does not pose an obstruction to the audience's view. Furthermore, according to this embodiment, the flexible tube 57 allows the microphone 56 to be pointed in any direction toward the position of the speaker, it becomes possible to use a microphone having narrow directivity, and thereby eliminate a great deal of surrounding background noise. In this regard, it should be noted that the microphone arrangement of this embodiment and the two previous embodiments described above can be provided on prompters. If do so, it is possible to achieve the same results described above.

Now, the half mirror 60 is made from a plate of transparent glass or resin coated with a substance having a high index of refraction. In particular, titanium oxide (TiO2) is preferred as a substance having a high index of refraction. Further, it is also possible to form a hologram in the transparent plate of glass or resin so that the plate becomes a holographic combiner.

Figure 17:
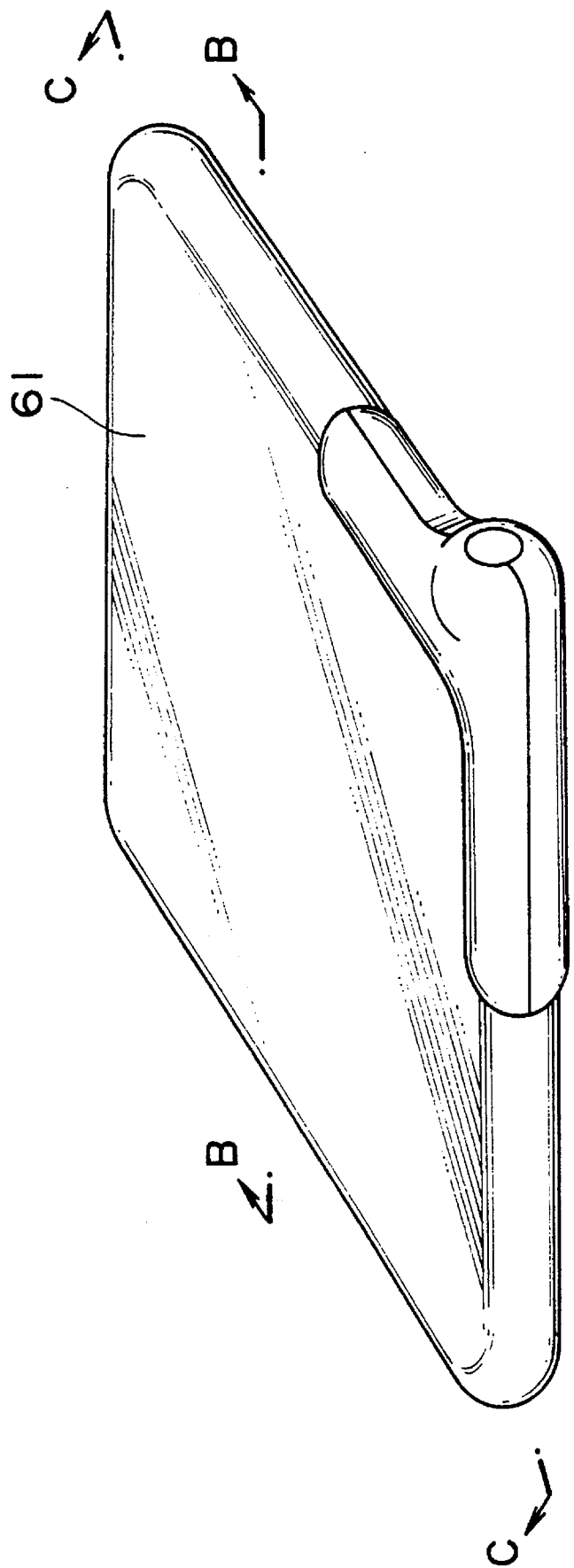
FIG. 17 is a perspective view of another embodiment of a half mirror in which the edges thereof are shaped to have semicircular cross sections.
Figure 18:
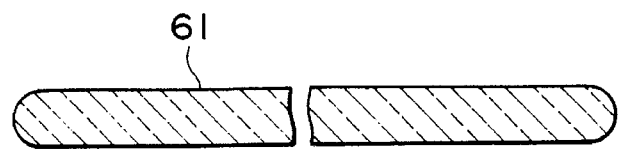
FIG. 18 is a cross-sectional view of the half mirror of FIG. 17 taken along line B—B thereof.
Figure 19:
FIG. 19 is a cross-sectional view of the half mirror of FIG. 17 taken along line C—C thereof.

FIG. 17 shows another embodiment of a half mirror, in which all four edges of a half mirror 61 have been ground to form surfaces that have semicircular cross sections. In this connection, FIG. 18 is a cross-sectional view taken along line B—B of FIG. 17, and FIG. 19 is a cross-sectional view taken along line C—C of FIG. 17. Now, in the case where the edges of the half mirror form flat surfaces, the light that is refracted inside the half mirror and diffused toward the edges shines out of each of such edges in one set direction, and this can cause the edges of the half mirror to appear rather bright to the audience. However, in the case where the half mirror 61 having four edges formed so as to have the semicircular cross sections as shown in FIG. 17 is used, the light that is reflected inside the half mirror and then passes out of the edges is diffused by the semicircular surfaces thereof, and this enables the brightness of such edges to be reduced to a level that no longer causes a burden or distraction to the audience. As a result, the audience can see the speaker with paying any attention to the existence of the half mirror.

In this regard, it should be noted that the structure of the half mirror according to this embodiment can be applied to that used in prompters. If do so, it is possible to enjoy the same result that the edge portions will not be brightened.

Manuscript Sheet Feeding Apparatus

Figure 20:
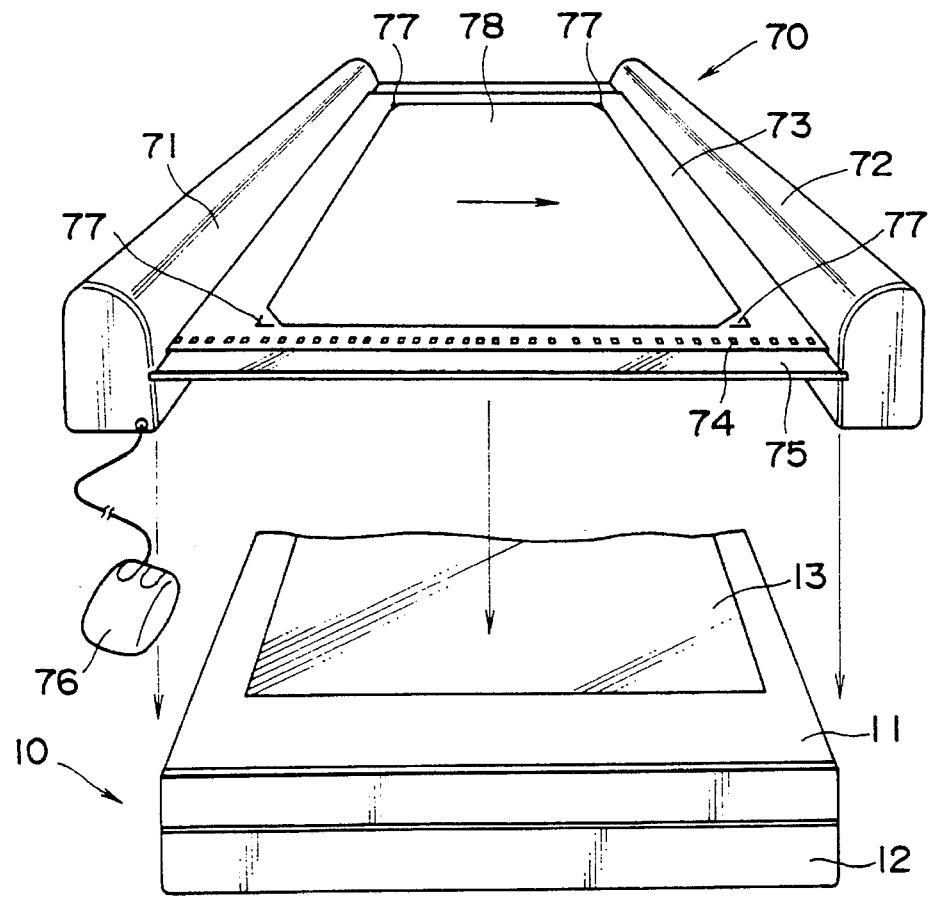
FIG. 20 is a perspective view of a manuscript feeding apparatus according to the present invention.

FIG. 20 is a perspective drawing of a manuscript sheet feeding apparatus which is provided above the diffusion plate 13 in order to continuously feed a plurality of manuscript sheets one sheet at a time onto the diffusion plate 13. As shown in FIG. 20, the manuscript sheet feeding apparatus includes a transparent film 73 having a plurality of slits 77 which are grouped into four-slit sets with each such set allowing insertion of the four corners of a manuscript sheet 78, a feeding unit 71 which feeds out the transparent film 73, a winding unit 72 which winds up the transparent film 73, and a transparent plate 75 which links the feeding unit 71 and the winding unit 72 together. In this case, if the feeding unit 71 and the winding unit 72 are constructed so as to be directly fitted or mounted to the main body 10, there is no need for the provision of the transparent plate 75.

In the feeding unit 71, there are provided a roller (not shown in the drawing) around which a transparent film 73 having a plurality of manuscript sheets which are attached along the moving direction of the film and a motor (not shown in the drawing) for driving the roller through gears (not shown in the drawing). As described above, each of the manuscript sheets is attached to the file by inserting their respective four corners into the respective four slits formed in the film. In the same way as the feeding unit 71, in the winding unit 72, there are provided a roller for winding up the transparent film 73, and motor and gears for driving the roller (not shown in the drawings). In this construction, one end of the transparent film 73 is secured to the roller inside the feeding unit 71 and the other end of the transparent film 73 is secured to the roller inside the winding unit 72. Further, as will be described hereinbelow, the motors of the feeding unit 71 and the winding unit 72 are controlled by a controller 76. In the roller of the winding unit 72, winding gears (not shown in the drawing) are provided at both sides thereof. The winding gears are adapted to mesh with slots 74 formed in the transparent film 73 at regular spacings along a straight line on both sides thereof. In this way, the transparent film 73 can be kept within the roller width and therefore it is wound up securely.

Now, when the manuscript sheet feeding apparatus 70 is to be used, it is placed on top of the main body 10 of the manuscript display apparatus. Then, the motor of the winding unit 72 is activated to wind the transparent film 73, which had been previously wound onto the roller of the feeding unit 71, onto the roller of the winding unit 72. Next, the last page of the manuscript sheets is attached to the transparent film 73 by inserting its four corners into appropriate slits 77 of the transparent film 73. Then, the motor of the feeding unit 71 is activated so as to wind the portion of the transparent film 73 mounted with the last page of the manuscript onto the roller of the feeding unit 71. Next, the second to the last page of the manuscript sheets is also attached to the film 73 by inserting its four corners into the next set of slits 77 of the transparent film 73 and then this portion is wound onto the roller of the feeding unit 71. This process is continued until all the pages of the manuscript sheets have been mounted onto the transparent film 73 and rolled onto the roller of the feeding unit 71. At this point, preparation of the manuscript sheet feeding apparatus is completed.

According to the embodiment of the manuscript sheet feeding apparatus 70 as described above, by operating the controller 76, a speaker can activate the motor of the winding unit 72 to sequentially display the pages of the manuscript sheets as virtual images in the half mirror. In this case, the speaker can use the controller 76 to selectively activate either of the motors of the feeding unit 71 and the winding unit 72. Moreover, the controller 76 can be used to adjust the speed of such motors. Accordingly, by activating the motor of the winding unit 72 to wind up the transparent film 73 by the winding unit 72, it becomes possible for the speaker to read sequentially each page of the manuscript sheets. Furthermore, by activating the motor of the feeding unit 71, it becomes possible to easily re-display any page that was previously displayed and wound around the roller of the winding unit 72. Moreover, the controller 76 can be used to rapidly or slowly wind or rewind the transparent film 73.

In the embodiment described above, a belt-like sheet of manuscript pages was formed by inserting the corners of the manuscript pages into slits of a transparent film. However, it is also possible to form such a sheet by using glue or the Like to bond the pages together. In this case, one end of the so-formed sheet would be directly secured to the roller of the feeding unit and the other end would be secured to the roller of the winding unit. In this connection, it is also possible to make such a belt-like sheet by writing the manuscript directly onto a roll of paper. Further, it is also possible to use a manuscript sheet prepared by using a word processor or the like to print the manuscript directly onto a roll of paper. Moreover, if desired, manually operated cranks can be used in place of the motors of the feeding unit and the winding unit.

Finally, it must be mentioned that many changes and additions may be made to the embodiments described above without departing from the scope of the invention as defined by the appended claims.

What is claimed is:

1. Manuscript display apparatus, comprising manuscript sheet supporting means formed for supporting a manuscript sheet in which a manuscript to be displayed is written; light generating means which generate light adapted to pass through the manuscript sheet supported on said manuscript sheet supporting means; and mirror means arranged to reflect the light which is generated by said light generating means and to pass the light through the manuscript sheet; support means for supporting said mirror means, said mirror means being a half mirror having a corner portion, said support means having an upper end portion, said corner portion of said half mirror being pivotally supported on said upper end portion of said support means; and a universal coupling means pivotally supporting said corner portion of said half mirror on said upper end portion of said support means.

2. Manuscript display apparatus as defined in claim 1; and further comprising a time display means which displaces a time display image as a virtual image in said mirror means, said time display means being arranged so as to be rotatable in order to selectively display the virtual time display image in said mirror means in one of a widthwise direction and a lengthwise direction of said mirror means.

3. Manuscript display apparatus as defined in claim 1; and further comprising a main body which includes said manuscript sheet supporting means and said light generating means, and has a side surface, said support means including a lower end portion which is pivotally attached to a portion of said main body along a plane which is parallel to said side surface of said main body.

4. Manuscript display apparatus as defined in claim 3; and further comprising a microphone.

5. Manuscript display apparatus as defined in claim 4; and further comprising a microphone attaching means for attaching said microphone.

6. Manuscript display apparatus, comprising manuscript sheet supporting means formed for supporting a manuscript sheet in which a manuscript to be displayed is written; light generating means which generate light adapted to pass through the manuscript sheet supported on said manuscript sheet supporting means; and mirror means arranged to reflect the light which is generated by said light generating means to pass the light through the manuscript sheet; a time display means which displays a time display image as a virtual image in said mirror means, said time display means including a bar graph display element.

7. Manuscript display apparatus, comprising manuscript sheet supporting means formed for supporting a manuscript sheet in which a manuscript to be displayed is written; light generating means which generate light adapted to pass through the manuscript sheet supported on said manuscript sheet supporting means; and mirror means arranged to reflect the light which is generated by said light generating means to pass the light through the nnanuscript sheet; and a marker display means for displaying a marker image which indicates a desired position on the manuscript so that the marker image is displayed in said mirror means as a virtual image, said marker display means including a plurality of marker lights arranged at regular intervals, a switch for lighting up said marker lights, and marker control means for controlling the lighting up of said marker light so that an operation of said switch causes said marker lights to be lit up sequentially.

8. Manuscript display apparatus, comprising manuscript sheet supporting means formed for supporting a manuscript sheet in which a manuscript to be displayed is written; light generating means which generate light adapted to pass through the manuscript sheet supported on said manuscript sheet supporting means; and mirror means arranged to reflect the light which is generated by said light generating means to pass the light through the manuscript sheet; and a marker display means for displaying a marker image which indicate a desired position on the manuscript so that the marker image is displayed in said mirror means as a virtual image, said marker display means including a plurality of marker lights arranged at regular intervals, and control means for sequentially lighting up each of said marker lights after a prescribed time intervals has elapsed.

9. Manuscript display apparatus, comprising manuscript sheet supporting means formed for supporting a manuscript sheet in which a manuscript to be displayed is written; light generating means which generate light adapted to pass through the manuscript sheet supported on said manuscript sheet supporting means; and mirror means arranged to reflect the light which is generated by said light generating means to pass the light through the manuscript sheet, said manuscript sheet supporting means having a notch for allowing easy removal of the manuscript sheet placed on said manuscript sheet supporting means.

10. Manuscript display apparatus, comprising manuscript sheet supporting means formed for supporting a manuscript sheet in which a manuscript to be displayed is written; light generating means which generate light adapted to pass through the manuscript sheet supported on said manuscript sheet supporting means; and mirror means arranged to reflect the light which is generated by said light generating means to pass the light through the manuscript sheet, said manuscript sheet supporting means having an indentation for allowing easy removal of the manuscript sheet placed on said manuscript sheet supporting means.

11. Manuscript display apparatus, comprising manuscript sheet supporting means formed for supporting a manuscript sheet in which a manuscript to be displayed is written; light generating means which generate light adapted to pass through the manuscript sheet supported on said manuscript sheet supporting means; and mirror means arranged to reflect the light which is generated by said light generating means to pass the light through the manuscript sheet, said mirror means including a half mirror with end portions shaped so as to have a semicircular cross-section.

12. Manuscript display apparatus, comprising manuscript sheet supporting means formed for supporting a manuscript sheet in which a manuscript to be displayed is written; light generating means which generate light adapted to pass through the manuscript sheet supported on said manuscript sheet supporting means; and mirror means arranged to reflect the light which is generated by said light generating means to pass the light through the manuscript sheet, said mirror means having including a first portion located relatively close to said manuscript sheet supporting means and a second portion located relatively far from said manuscript sheet supporting means, said first portion having a lower reflectance than said second portion.

13. Manuscript display apparatus, comprising manuscript sheet supporting means formed for supporting a manuscript sheet in which a manuscript to be displayed is written; light generating means which generate light adapted to pass through the manuscript sheet supported on said manuscript sheet supporting means; and a half mirror arranged to reflect a light which is generated by said light generating means and to pass the light through the manuscript sheet, said manuscript sheet supporting means including a first light permeable plate formed so that the light generated by said light generating means passes through said first light permeable plate, said light generating means including a second light permeable plate having at least one end surface, a light source which is provided at said end surface of said second light permeable plate and a reflection film which reflects a light from said light source, said reflection film being provided on one of said light source and said second light permeable plate, said reflection film having a surface with an innumerable number of reflection dots having a size which is relatively small in regions of the reflection film that lie relatively close to said light source and become increasingly larger with an increasing distance from said light source.

14. Manuscript display apparatus, comprising manuscript sheet supporting means formed for supporting a manuscript sheet in which a manuscript to be displayed is written; light generating means which generate light adapted to pass through the manuscript sheet supported on said manuscript sheet supporting means; and a half mirror arranged to reflect the light which is generated by said light generating means and to pass the light through the manuscript sheet, in said light generating means including a light permeable plate having at least one end surface, a light source provided at said end surface and a reflection film which reflects the light from said light source, said light permeable plate forming said manuscript sheet supporting means, said reflection film being provided on at least one of said light source and said light permeable plate, said reflection film having a surface with an innumerable number of reflection dots having a size which is relatively small in regions of the reflection film that lie relatively close to said light source and become increasingly larger with increasing distance from said light source.

* * * * *